April 21, 1931.  R. T. ROMINE  1,802,220
CAR LOADING AND UNLOADING METHOD
Filed Oct. 12, 1926  4 Sheets-Sheet 3
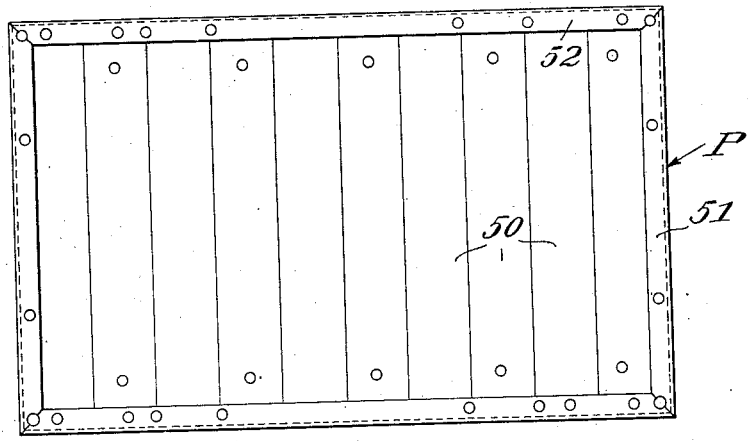
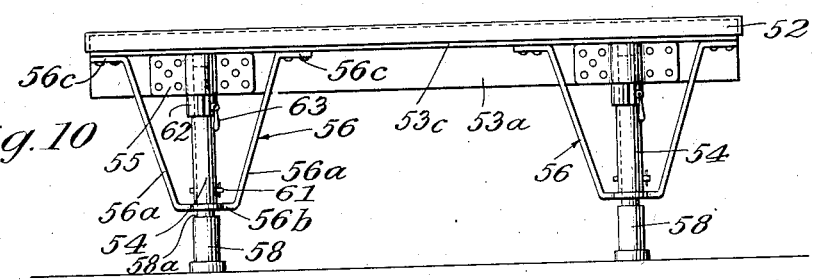
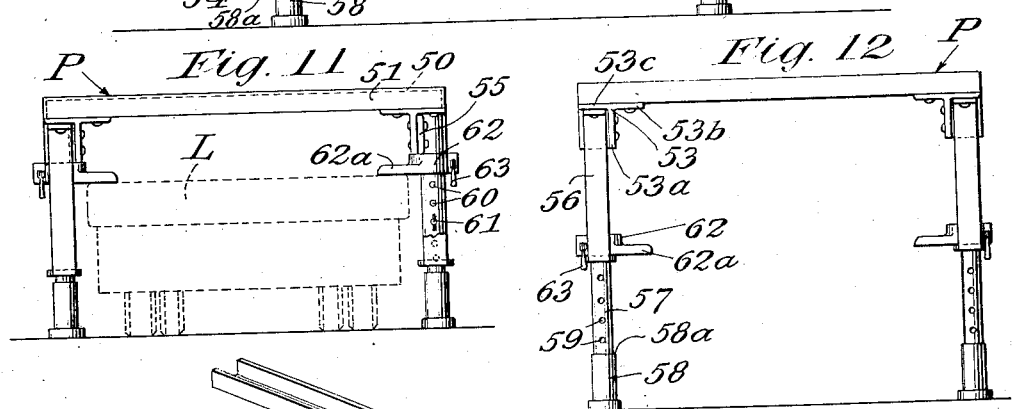
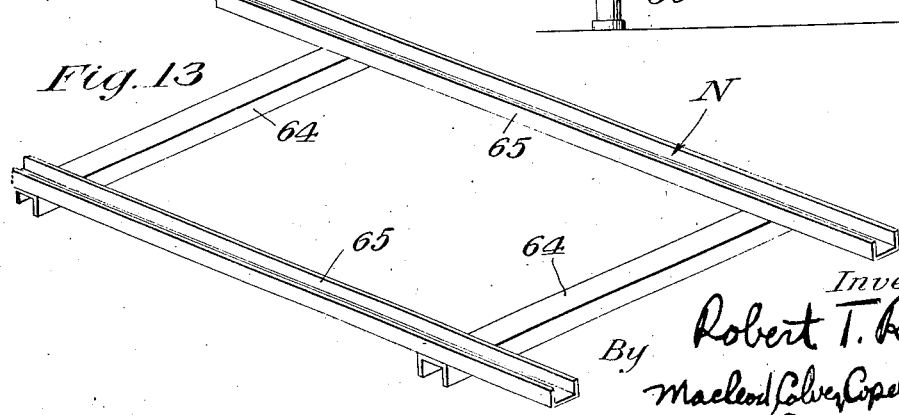

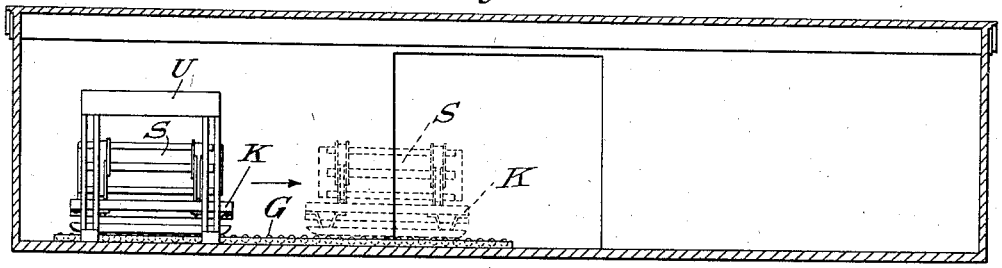
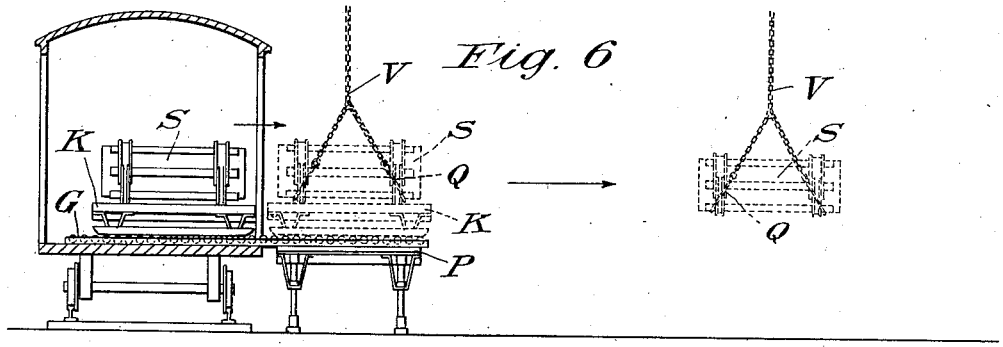
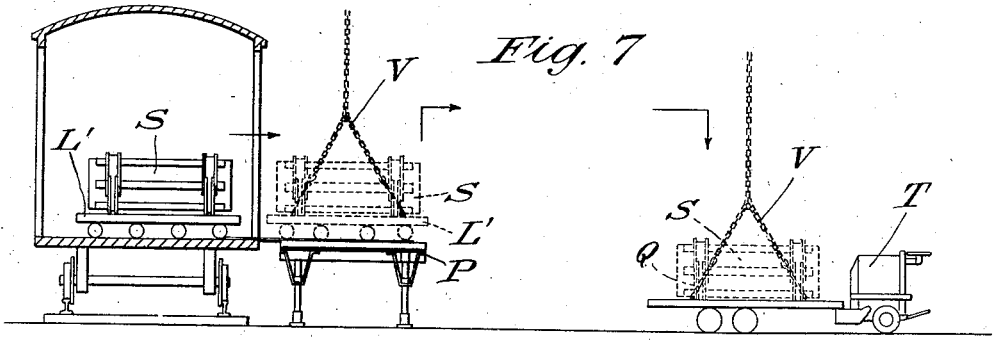
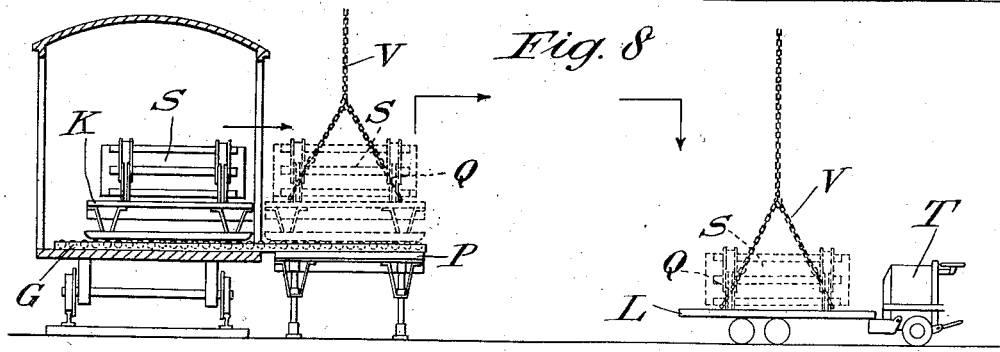

Patented Apr. 21, 1931

1,802,220

UNITED STATES PATENT OFFICE

ROBERT T. ROMINE, OF MOUNT CLEMENS, MICHIGAN

CAR LOADING AND UNLOADING METHOD

Application filed October 12, 1926. Serial No. 141,129.

This invention relates to a method of loading and unloading freight cars, the invention particularly concerning the handling of extremely heavy units such as packs of sheet, strip or bar metal weighing as much as ten tons and shipped on the floor of the car.

One of the purposes of this invention is to provide a method for unloading heavy packs or stacks of metal without breaking up the packs or bundles or without any manual handling of the separate parts, under conditions where the floor of the freight car is above the ground or the level of the loading dock or platform.

In many factories or plants the railroad tracks are not depressed or submerged below the ground level so that when loading or unloading the car, the floor of the car is a substantial distance above the ground level. Heretofore the unloading of metal such as sheet steel under such conditions has required considerable separate and duplicate handling of the sheets. For instance, at one well known automobile plant the workmen pick up the sheets one at a time from the stack at the end of the car, carry it to the car doorway, hand the metal sheet down to workmen stationed on the ground, who in turn pile the sheets on a suitable truck or platform. It will, therefore, be seen that the loading of forty tons of metal such as sheet steel, from a car in such a manner requires an immense amount of labor and time aside from other disadvantages. Such a method causes great congestion, especially where the cars run directly into the plant, since an entire line of cars is necessarily tied up until the material in any one car is unloaded.

The present application is a continuation in part of my co-pending applications Serial No. 109,124, filed May 14, 1926, Patent No. 1,615,813 and Serial No. 128,397, filed August 10, 1926, Patent No. 1,751,717. In said applications, I have shown and described the broad idea of packing metal for shipment on the car floor and the automatic handling of the heavy packs, when loading or unloading, without separating or breaking up the packs and in such cases, I have adopted for illustration typical conditions where the tracks are submerged and the car floor is substantially at the ground level. In the present invention, I have utilized the broad idea of said applications while providing a method which may be carried out under typical conditions where the car floor is substantially above the ground level, and where on account of the differences in levels, difficulties are encountered in the bodily handling of extremely heavy units such as ten ton stacks of metal.

Other objects of this invention will appear in the following description and appended claim, reference being had to the drawings illustrative of the invention wherein like reference characters designate corresponding parts in the several views.

Figs. 5 and 6 are diagrammatic views similar to Figs. 3 and 4 showing a different manner of conveying the stack as a unit out of the car.

Fig. 7 is a diagrammatic view similar to Fig. 4, showing the manner of conveying the stack from the level of the car floor on to a lift truck platform.

Fig. 8 is a diagrammatic view similar to Fig. 6, showing the stack conveyed from the car floor and deposited on a lift truck platform.

Fig. 9 is a plan view illustrating the adjustable loading platform or dock.

Fig. 10 is a side elevation thereof.

Fig. 11 is an end elevation, partly broken away, of the loading platform or dock and also showing the lift truck platform in position beneath the lifting dogs of the platform.

Fig. 12 is an end elevation showing the loading platform in one of its adjusted positions.

Fig. 13 is a fragmentary perspective view showing the channel supporting ramp which may be used for guiding the stack lifter or crane on to the freight car floor.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

It will be understood that the present method may be carried out either for loading or unloading a freight car. For the purposes of simplifying the specification, the description herein is directed more particularly to the application of the method for unloading the freight car and it will be readily understood that where the method is carried out for loading a freight car, the steps of the method employed for unloading the car will simply be reversed. The metal, such as sheet steel, is packed or crated for shipment on the car floor so that the sheets or parts of the bundle or stacks will be maintained substantially intact within the bundle against shifting or displacement during transit. The metal is therefore transported in the car so that the bundles may be taken from the car in units without requiring as heretofore the breaking up of the bundles or stacks and separate handling in order to unload. In the present case, I have illustrated in general an apparatus for bracing and binding the stack together on the car floor so that at its destination the stack will be in such position and condition as to permit a stack lifter U to straddle the stack on the car floor and lift it as a unit on to a conveying medium.

Figure 14:
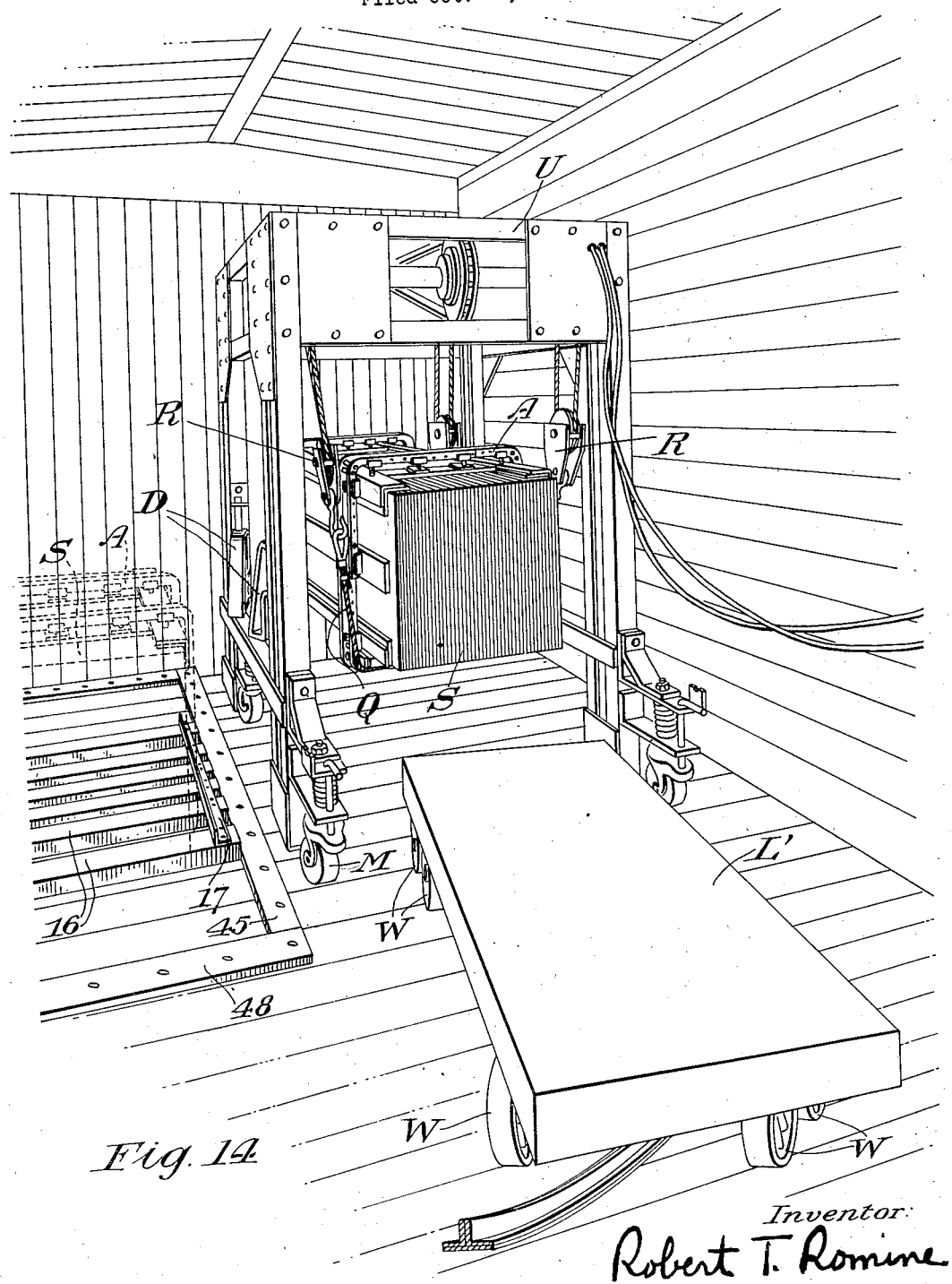
Fig. 14 is a perspective view illustrating the manner in which a stack of metal may be loaded on the floor of a freight car and also showing a stack lifted from the car floor into position to be deposited on a conveying medium.

Referring to Fig. 14 each stack of metal is supported on the car floor on a series of cross beams or sills 16, preferably of relatively soft wood and these wooden sills are secured together at opposite ends by means of spaced lengthwise extending structural angle bars 17 which are secured to the several members 16. The stack is bound or clamped together by means of a plurality of bracing frames or devices designated A. Each bracing or clamping frame comprises four angular steel members having curved right angle bends at the four corners of the stack, and the members are adjustably connected together in overlapping relation so as to accommodate stacks of various heights and widths. Each clamping frame carries a number of pressure devices at the top and sides thereof which exert pressure against the stack through the medium of lengthwise extending wood strips and angle members at the longitudinal corners of the stack. A detailed description of this apparatus is not deemed necessary herein since it is fully described in my above mentioned application.

The metal in the present case is illustrated as sheet steel packed on the car floor with the sheets mounted on their edges, as shown at S in Fig. 14. The stack of sheets is, therefore, bound together as a unit and held together against relative displacement of the individual sheets. In addition the stack is held on the wood members 16 so as to prevent relative movement of the stack and the supporting members 16. The supporting members 16 in turn form a unitary platform or pallet not directly secured or clamped to the floor of the car but allowed to float or ride on the car floor longitudinally thereof. The stack and the supporting members 16 therefore travel or move back and forth on the car floor as a single unit or mass when the car is subjected to jolts, shocks or collisions.

The supporting pallet or frame comprising the cross members 16 is guided longitudinally of the car by means of lengthwise extending guides 45 at opposite sides of the stack. These guide members are secured to the car floor, and emergency stops 48 may be secured to the car floor a sufficient distance beyond the opposite ends of the stack to prevent excessive travel of the stack under abnormal conditions.

For the purpose of conveying the stack of metal from the level of the car floor on to the ground or other supporting medium below the car floor level, I have provided in the present instance a portable loading dock or platform which is adapted to be adjusted to the height of the car floor and positioned at the edge of the car floor or at the car doorway so as to permit the stack to be conveyed out of the car into such position as to enable it to be lifted to the ground or to a lift truck platform or the like.

Referring to Fig. 9, the portable platform or loading dock P comprises a load supporting floor formed from a series of cross boards 50. This floor is bound around its four sides by means of an angle iron frame comprising lengthwise extending angle members 52 at the opposite longitudinal edges and transverse angle irons 51 at the opposite ends of the floor. Extending beneath the floor at opposite longitudinal sides thereof are a pair of parallel supporting truss members 53. In the present instance each truss is in the form of a rolled steel T-bar providing a vertical guide flange 53a and oppositely extending horizontal flanges 53b and 53c. The platform floor is supported by means of a pair of extensible legs at each side thereof, the legs being positioned at the outer sides of the vertical flanges 53a of the truss members and each leg being preferably identical in construction.

Each of the supporting legs for the platform comprises a vertical tubular member 54 which is rigidly secured at its upper end to the flange 53a by means of a bracket 55 having a tubular portion embracing the upper end of the leg 54 and also having flanges riveted to the T-bar flange 53a. Each support for the platform also comprises a substantially V-shaped leg 56 which comprises a steel bar bent to provide a flat bottom foot 56b and upwardly diverging sides 56a which are bent at the upper ends to provide attaching portions 56c riveted to the underside of the T-bar flange 53c. The foot 56b of the leg is widened at its middle and provided with a hole to embrace the lower end of the tube 54, and it will be seen that the leg portions 54 and 56 provide a rigid cooperating support adapted to sustain heavy loads. The construction so far described provides a portable platform of standard height and dimensions capable of being used with an electric lift truck such as shown in my co-pending application Serial No. 118,584, June 25, 1926.

The portable platform may be readily transformed to provide an extensible platform so that the height of the platform floor may be raised enabling it to be used as a portable loading dock and at the same time capable of being picked up and transported by means of the lift truck T. To accomplish this each leg may be provided with a telescoping section 57 preferably of tubular metal and of a size to permit it to extend freely into the tubular leg 54. The leg extension 57 is widened at its lower end 58 to provide a shoulder 58a against which the lower end of the leg 54 and foot portion 56b will rest when the platform is in its lowest position. The extensible section 57 of each leg is provided with a vertically spaced series of holes 59, and the leg 54 is provided with a corresponding series of holes 60. When the platform is extended as shown in Fig. 12, it may be locked in extended position by means of pins 61 insertable through the registering holes 59 and 60 of the telescoping leg sections.

Where the portable platform is used in conjunction with the extensible leg sections 57, I provide means for enabling the platform to be lifted and transported on the lift platform L of the truck T. In the present instance this means comprises lifting dogs 62 adjustably mounted on the several legs 54. Each lifting dog comprises a split spring sleeve embracing the cylindrical leg member 54 and adapted to be compressed or clamped by friction thereon in adjusted position by means of a cam lever 63 which operates to clamp the sleeve 62 on to the leg 54. This construction is preferably the same as that shown and described in my co-pending application Serial No. 129,139, filed August 14, 1926. The lifting dog 62 has a projecting foot portion 62a capable of overlying the truck platform L.

The lifting dogs 62 may be adjusted vertically on the legs 54 from their highest positions shown in Fig. 11 where the dogs will abut against the lower edge of the T-bar flange 53a to the positions shown in Fig. 12. The platform may be adjusted as to height by means of the lift truck T. Assuming that the truck platform and portable platform are in the relative positions shown in Fig. 11, the pins 61 are removed and the lift truck platform L raised by the usual truck mechanism. Assuming that the lifting range of the truck platform is four and one-half inches, the floor 50 will be elevated this distance, which will result in extending the telescoping legs an equivalent distance. The pins 61 are then inserted in the registering holes, the truck platform lowered, and the lifting dogs 62 are then loosened and adjusted downwardly so as again to overlie and engage the top of the truck platform. The dogs are then tightened, the pins 61 removed again, and the truck platform elevated, thereby raising the floor 50 a vertical distance equal to the lifting range of the truck platform. If this range is four and one-half inches two operations will raise the portable platform nine inches.

When the leg extensions 57 are removed and the dogs 62 turned so as to extend parallel to and between the pairs of legs, the platform may be used as a standard platform, and in this case the truck platform L when introduced beneath the floor 50 will be guided by the flanges 53a and will act against the flanges 53b when elevated. The height of the portions 58 of each extensible leg is therefore substantially the same as the depth of the T-bar flange 53a, enabling the truck platform to engage the dogs 62a when the leg extensions are used or to engage the flanges 53b when these extensions are removed.

Figure 1:
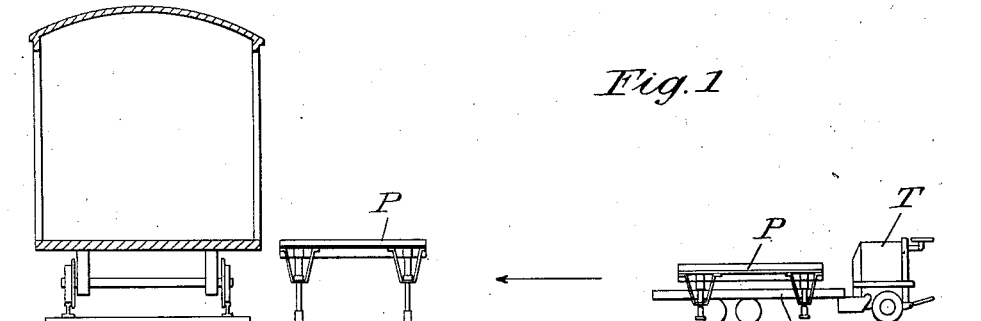
Figs. 1 and 2 are diagrammatic side views showing the manner of moving a portable stack lifter from the ground level on to the floor of a freight car.

Referring to Fig. 1, the portable platform

Figure 2:
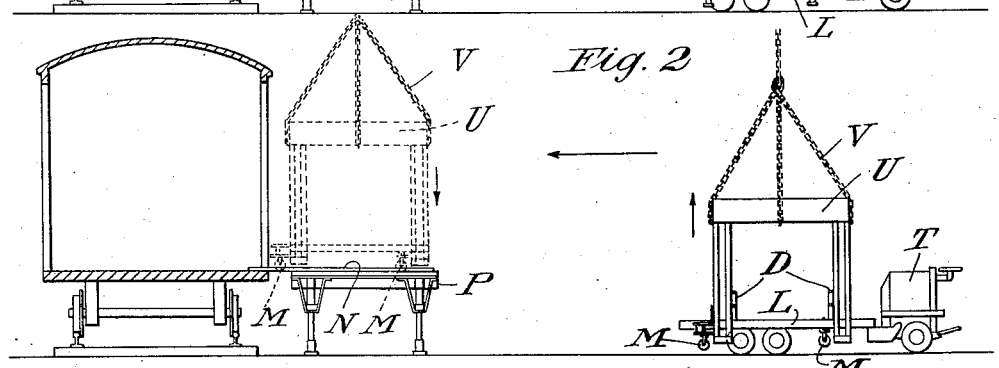
Figure 3:
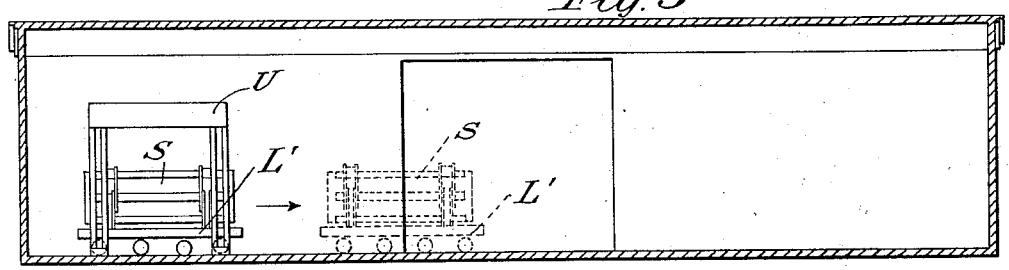
Fig. 3 is a side elevation illustrating diagrammatically a manner of lifting and carrying the stack to the car doorway.

P may be picked up on the lift truck platform L and carried into position adjacent the car door, and the floor of the portable platform may be elevated by the truck and adjusted to substantially the same level as the car floor. Thereupon the portable crane U is picked up and carried on the lift platform L of a lift truck T and carried to a position adjacent the loading platform P as shown at the right in Fig. 2. The portable crane or stack lifter U is then hoisted by means of the usual overhead crane in the plant, which is connected to the top of the stack lifter by means of suitable chains and hooks V. The stack lifter is deposited on a channel ramp N which is placed on the platform P. This ramp comprises a pair of supporting cross channels 64 mounted in inverted position. A pair of lengthwise extending guide channels are secured to the opposite ends of the channels 64 (see Fig. 13) and the ends of the channels 65 project a sufficient distance beyond the cross channels 64 so that when the ramp is placed on the portable platform P the channels 65 will overlie the floor of the car as shown in Fig. 2. The stack lifter U is deposited on the ramp N so that the caster wheels M of the stack lifter will travel in the channels 65. The stack lifter is then moved into the car on its casters into position to straddle the load as shown in Figs. 3 and 14.

Where a portable platform P of standard dimensions is used I employ the ramp N since the gage or transverse distance between the casters of the stack lifter is greater than the width of the platform. This construction, however, has the advantage of enabling a standard dimension portable platform to be utilized as a portable adjustable loading dock. The loading dock P however may be constructed with special dimensions to accommodate the width of the stack lifter, and in such case the ramp N may be omitted.

After the stacks of metal arrive at their destination on the car floor, in the manner indicated in dotted lines at the left in Fig. 14, the guides 45 and stops 48 are removed from the car floor. Thereupon the stack lifter U is wheeled into position to straddle opposite sides of the stack as well as the platform members 16. A pair of steel cables Q are introduced beneath the stack, each cable terminating at opposite ends in an attaching loop to which is connected the hook of one of the four sheave blocks R of the hoisting mechanism for the stack lifter. The stack of metal is therefore lifted by distributing its weight from four attaching points to the four hoisting drums of the lifting mechanism. The bundle is hoisted vertically and thereupon the supporting pallet 16 slid out from beneath the stack. A conveying medium is then introduced beneath the stack S and in Figs. 3, 4, 7 and 14 this is shown in the form of a trailer L' having eight load distributing wheels W adapted to distribute the weight of the stack over a substantial area on the floor.

Figure 4:
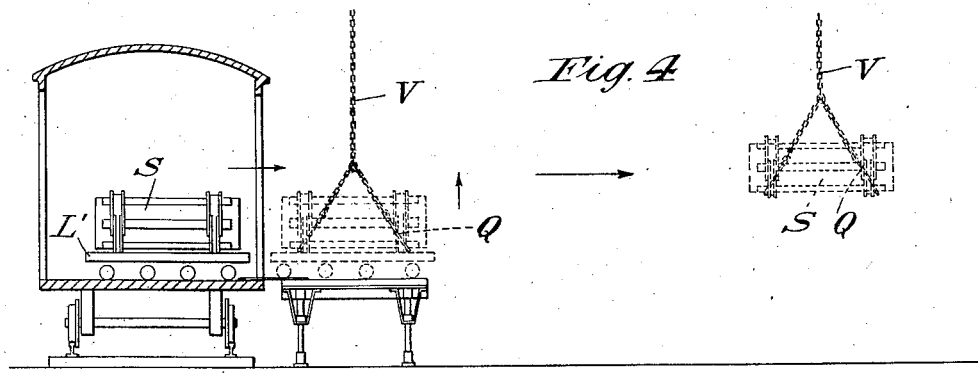
Fig. 4 illustrates the manner of conveying the stack out of the car in position to be transferred to the ground or other supporting medium.

After the stack is deposited on the trailer L' the latter is wheeled through the car doorway on to the portable loading platform or dock P as shown in Fig. 4. The overhead crane is then attached at four points to the opposite ends of the steel cables Q and the entire stack hoisted from the trailer L' and either deposited on the ground or on the lift platform of an electric truck T, as shown in Fig. 7.

Where desired the stack may be conveyed off the car floor by means of a portable platform capable of being propelled on sections of anti-friction or gravity rolls. As shown in Figs. 5, 6 and 8, the stack is lifted in the manner shown in Fig. 14. Thereupon spaced parallel sections of gravity or anti-friction rolls G are laid on the car floor to extend from the loading dock P to a point beneath the stack S when in elevated position. A portable platform K having parallel skids cooperating with the spaced sections of gravity rolls is moved into position beneath the elevated stack S. The stack is deposited on the platform K and the latter is conveyed through the car doorway in the manner shown in Figs. 5 and 6. Thereupon the stack is lifted from the platform K by means of the overhead crane and either deposited on the ground or on a truck platform L, as shown in Fig. 8.

A detailed description of the platform K and gravity roll sections or tracks G is not deemed necessary herein since the same is fully described in my above mentioned application Serial No. 128,397. The portable stack lifter U is preferably constructed in accordance with my co-pending application Serial No. 133,374, filed September 3, 1926. This stack lifter, as particularly described in said application is provided with swinging lifting dogs D at each side thereof. These dogs may be swung into position to overlie the lift truck L, as diagrammatically shown in Fig. 2, so that when the truck platform is introduced between the spaced supporting legs of the stack lifter and beneath the lifting dogs D, the stack lifter may be lifted and carried on the truck platform.

What I claim is:

The herein described method of unloading heavy bundles or packages from a car where the car floor is a substantial distance above the ground level, which consists in mounting a portable loading platform having vertically adjustable legs on an adjustable truck platform, so that the legs are out of engagement with the ground, disposing the loading platform outside the car door, elevating the truck platform until the loading platform is substantially level with the car floor, moving the adjustable legs into engagement with the ground and locking them in this position, lowering the truck platform relative to the loading platform to permit withdrawal of the truck from beneath the loading platform, lifting the pack vertically above the car floor, and conveying it as a unit to the loading platform.

In testimony whereof I affix my signature.

ROBERT T. ROMINE.